United States Patent [19]

Livingston

[11] Patent Number: 5,160,114
[45] Date of Patent: Nov. 3, 1992

[54] MOUNTING ASSEMBLY FOR HAND-HELD JOINER

[76] Inventor: Gaylord R. Livingston, P.O. Box 1687, Plattsburgh, N.Y. 12901

[21] Appl. No.: 638,991

[22] Filed: Jan. 19, 1991

[51] Int. Cl.[5] .............................................. F16M 1/00
[52] U.S. Cl. .................................. 248/676; 144/136 C
[58] Field of Search ............... 248/676, 674, 671, 678, 248/680, 681; 51/170 R, 170 T; 144/136 C; 83/692, 693, 662; 30/514

[56] References Cited

U.S. PATENT DOCUMENTS

| | | | |
|---|---|---|---|
| 1,706,115 | 3/1929 | Hannah | 144/136 C |
| 1,879,458 | 9/1932 | Peltier | 248/671 |
| 2,591,002 | 4/1952 | Pedron | 144/136 C |
| 3,117,600 | 1/1964 | Davis . | |
| 3,437,115 | 4/1968 | Page . | |
| 3,712,174 | 1/1973 | Granfield . | |
| 3,896,861 | 7/1975 | Heisler | 30/388 X |
| 4,193,192 | 3/1980 | Cortez . | |
| 4,204,446 | 5/1980 | Knochel . | |
| 4,290,464 | 9/1981 | Marsan | 144/136 C |
| 4,462,381 | 7/1984 | Fushiya | 51/170 T X |
| 4,677,887 | 7/1987 | Martin . | |
| 4,807,506 | 2/1989 | Audet . | |
| 4,909,680 | 3/1990 | Wolff | 144/136 C X |
| 4,913,204 | 4/1990 | Moores et al. . | |
| 4,970,790 | 11/1990 | Anderson . | |
| 4,971,122 | 11/1990 | Sato | 144/136 C |
| 4,993,897 | 2/1991 | Anderhalden | 144/136 C X |

*Primary Examiner*—J. Franklin Foss
*Attorney, Agent, or Firm*—Venable, Baetjer & Howard

[57] ABSTRACT

A mounting assembly for mounting a hand-held tool to a bench surface is provided. The mounting assembly comprising a mounting plate having a substantially flat portion, at least one mounting arm extending from the flat portion, and a pair of coupling fixtures. The mounting arm has an engagement hole for receiving a fastener. Also includes in the mounting assembly is an elongated spring having two opposite ends, each end further having an engagement hook for engaging a respective coupling fixture of the mounting plate. Means are further provided for securing the mounting plate to the bench or work station surface. The assembly is attached to the hand-held tool at existing handle mounting points on the tool.

9 Claims, 4 Drawing Sheets

MOUNTING ASSEMBLY FOR HAND-HELD JOINER

BACKGROUND OF THE INVENTION

The invention relates to a mounting assembly for mounting a hand-held, portable power tool to a mounting surface for stationary bench use, and, in particular, to a mounting assembly that may be removably secured to existing mounting points of a conventional hand-held joiner.

A tool commonly used by carpenters in preparing workpieces to be joined together is a device known as a plate joiner that typically is used to cut bisquit joints, but which may be used to make other types of cuts in the workpiece. Conventional joiners may be of the stationary type, in which case they are normally bulky, relatively large and expensive, or of the hand-held, portable type. The stationary joiners typically are extremely heavy in order to minimize the amount of vibration of the tool during use and, thereby, improve the accuracy of cutting. This extreme weight, however, at the same time inhibits the mobility of the machine. Hand-held joiners currently available, however, are of a much smaller dimension and weight and can easily be transported and manipulated by hand as the operator moves the joiner about a workpiece to be cut. These hand-held joiners are particularly useful for cutting workpieces, for example, a door frame, that cannot easily be brought to a stationary joiner.

Occasionally, however, the operator of a hand-held joiner may find it useful to have the hand-held joiner held fixed or stationary so that the operator does not need to physically handle the tool but rather is free to utilize both hands in order to manipulate a workpiece with respect to the joiner. Conventional joiner machines, however, are not typically designed to be securely held in such a fixed position.

SUMMARY OF THE INVENTION

The present invention provides a means for securely mounting a conventional hand-held tool to a mounting surface, such as a bench or work station surface, for stationary bench use. Accordingly, there is provided a mounting assembly comprising a mounting plate having a substantially flat portion, at least one mounting arm extending from the flat portion, and a pair of coupling fixtures. The mounting arm has an engagement hole for receiving a fastener. Also included in the mounting assembly is an elongate spring having two opposite ends, each end further having an engagement hook for engaging a respective coupling fixture of the mounting plate. Means are further provided for securing the mounting plate to the bench or work station surface.

In preparation for mounting a tool to a mounting surface using the mounting assembly, the handle of the tool is first removed to expose at least one mounting point on the tool. The mounting plate is then positioned such that the flat portion thereof is laid flush against the bench surface with the mounting arm thereof extending on one side of the tool so that the engagement hole of the mounting arm is aligned with the at least one mounting point of the tool. The mounting plate is securely fastened to the bench surface by the securing means, and the mounting arm of the mounting plate is secured to the tool by a fastener. In order to ensure that the tool is held fixed with respect to the mounting plate, the elongate spring is tightly wrapped around a housing portion of the tool with its engagement hooks engaging respective coupling fixtures of the mounting plate.

BRIEF DESCRIPTION OF THE DRAWINGS

In the accompanying drawings, in which like reference indicate like parts.

DETAILED DESCRIPTION OF THE PREFERRED EMBODIMENTS

Figure 1:
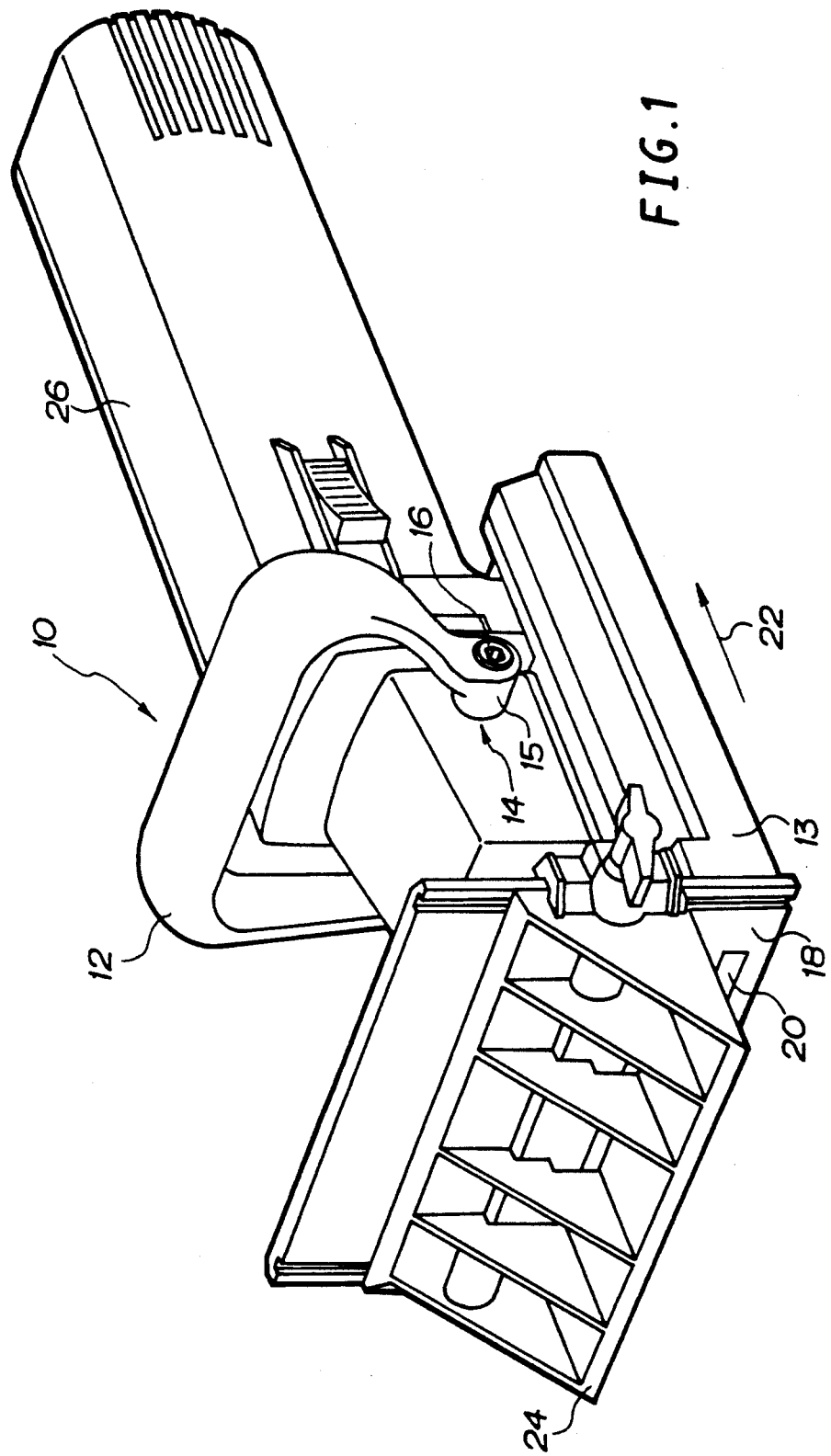
FIG. 1 is a perspective view of a conventional hand-held joiner.

Referring to FIG. 1, there is shown a conventional, portable, hand-held plate joiner 10 to which the mounting assembly 30 of the present invention (FIG. 2) may be fastened in order to adapt the joiner 10 for stationary bench use. A conventional, portable joiner 10 of the type shown typically has a removable handle 12 that is mounted to the joiner 10 at two mounting points 14 located on opposite sides of the joiner 10 (only one mounting point 14 is illustrated). The mounting points 14 are normally threaded holes adapted to receive handle bolts 16. As shown, the bolts 16 pass through holes provided in the ends 15 of the handle 12 to securely fasten the handle 12 to the joiner 10 at the mounting points 14. These bolts 16 may be removed to expose the mounting points 14. For purposes of clarity, the present invention will be described in connection with a conventional joiner 10; however, it is understood that other conventional hand-held tools having accessible mounting points, such as portable grinders, may also be adapted for stationary bench use by employing the mounting assembly of the present invention.

The joiner 10 of FIG. 1 has at one end a spring-biased, integral fence 18 having a blade recess 20. When conventionally applying the tool 10 to a workpiece to be cut, the spring-biased integral fence 18 is pressed against the workpiece such that the reaction force on the tool causes the integral fence 18 to slide against the force of an internal spring bias (not shown) in the direction of arrow 22, thereby exposing a cutting blade (not shown) as it projects from the recess 20. When the integral fence 18 is in its rest position, the cutting blade is housed within the base 13 of the tool. An adjustable fence 24 aids in aligning the power tool 10 with the workpiece during cutting of the workpiece. The motor for driving the cutting blade is enclosed in a housing 26 that extends rearwardly away from the fences 18 and 20.

Figure 2:
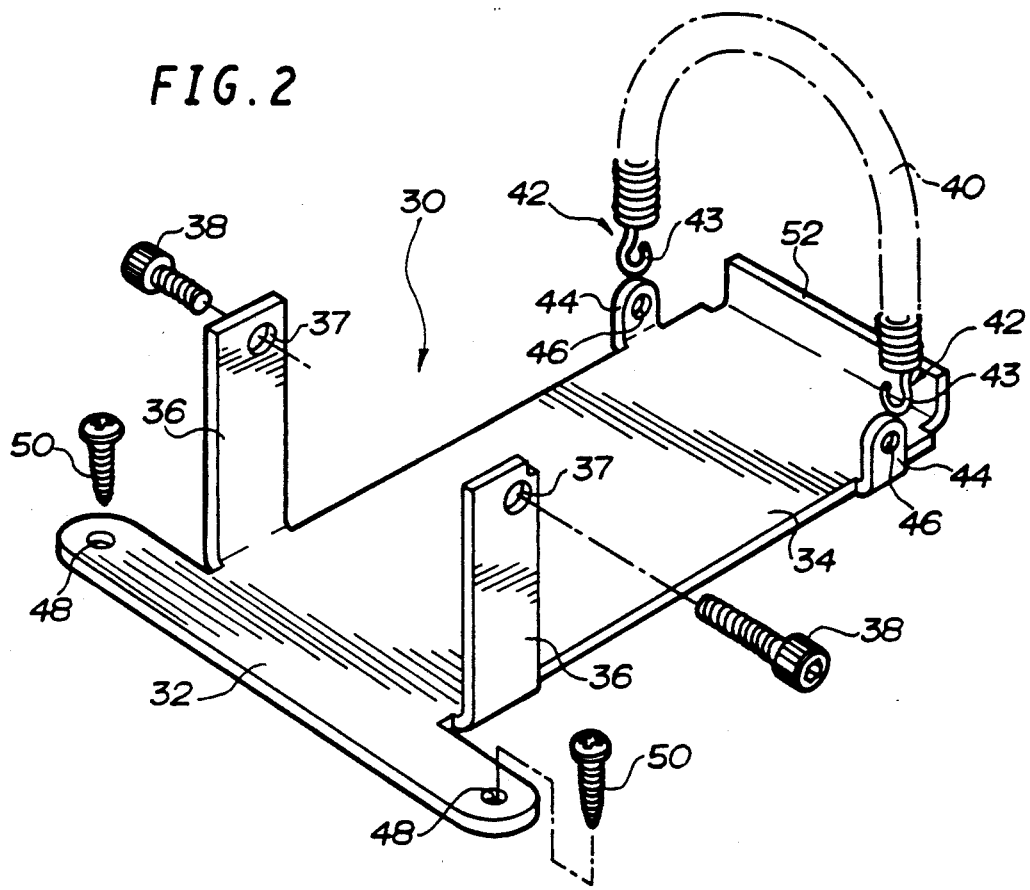
FIG. 2 is an exploded perspective view of the various components of the mounting assembly of the present invention.

Referring to FIG. 2, a preferred embodiment of the various components of the mounting assembly 30 of the present invention is illustrated. When in a bench-mounted position, the mounting assembly 30 physically couples a suitable hand-held tool to a desired bench surface. The mounting assembly 30 preferably includes a mounting plate 32 having a substantially flat portion 34. Extending from the flat portion 34 is at least one mounting arm 36. Preferably, there are two such mounting arms 36 that extend from the flat portion 34 at an angle of approximately 90°. The mounting arms 36 are configured so that they may be coupled to the mounting points 14 of a particular hand-held tool. Accordingly, the precise length and angle of the mounting arm with respect to the flat portion 34 of the mounting plate 32 is determined by the specific dimensions of the particular tool and, therefore the angle may be greater or less than 90° as necessary. The mounting arms 36 are provided with holes 37 for receiving fasteners such as bolts 38.

Also extending from the flat portion 34 of the mounting plate 32 are two coupling fixtures 44 located on opposite sides of the flat portion 34 for engaging respective ends 42 of an elongated spring 40. The spring 40 may be a coil-type spring or another suitable elongate spring, such as a bungee cord. The spring ends 42 and fixtures 44 are provided with complementary coupling means suitable for holding the spring ends 42 in engagement with the fixtures 44. In a preferred embodiment, the ends 42 of the elongate spring 40 are provided with hooks 43 and the fixtures 44 with holes 46 for receiving the hooks 43. Alternatively, each of the fixtures 44 may be provided with an engagement knob that may be grasped by a respective hook 43.

In order to affix the mounting plate 32 to a mounting surface (as described further below with reference to FIG. 3) holes 48 are provided on the flat portion 34 of the mounting plate 32 for receiving mounting bolts or screws 50. In addition, a lip 52 may be provided on the mounting plate 32 in order to assist in the positioning of the tool 10 with respect to the mounting plate 32.

In a preferred embodiment, the mounting plate 32 is made of aluminum of other suitable metal such as steel, that may be easily conformed to the desired configuration. Alternatively, the plate 32 may be made from a plastic which is sufficiently strong to withstand the relatively high stresses that would be present when the plate 32 is fully mounted. Several well-known epoxy fiber plastics are currently available that are of a sufficient strength. An advantage of having the plate 32 made from plastic is that its manufacture is a relatively simple process, involving primarily only a single molding step.

Figure 3:
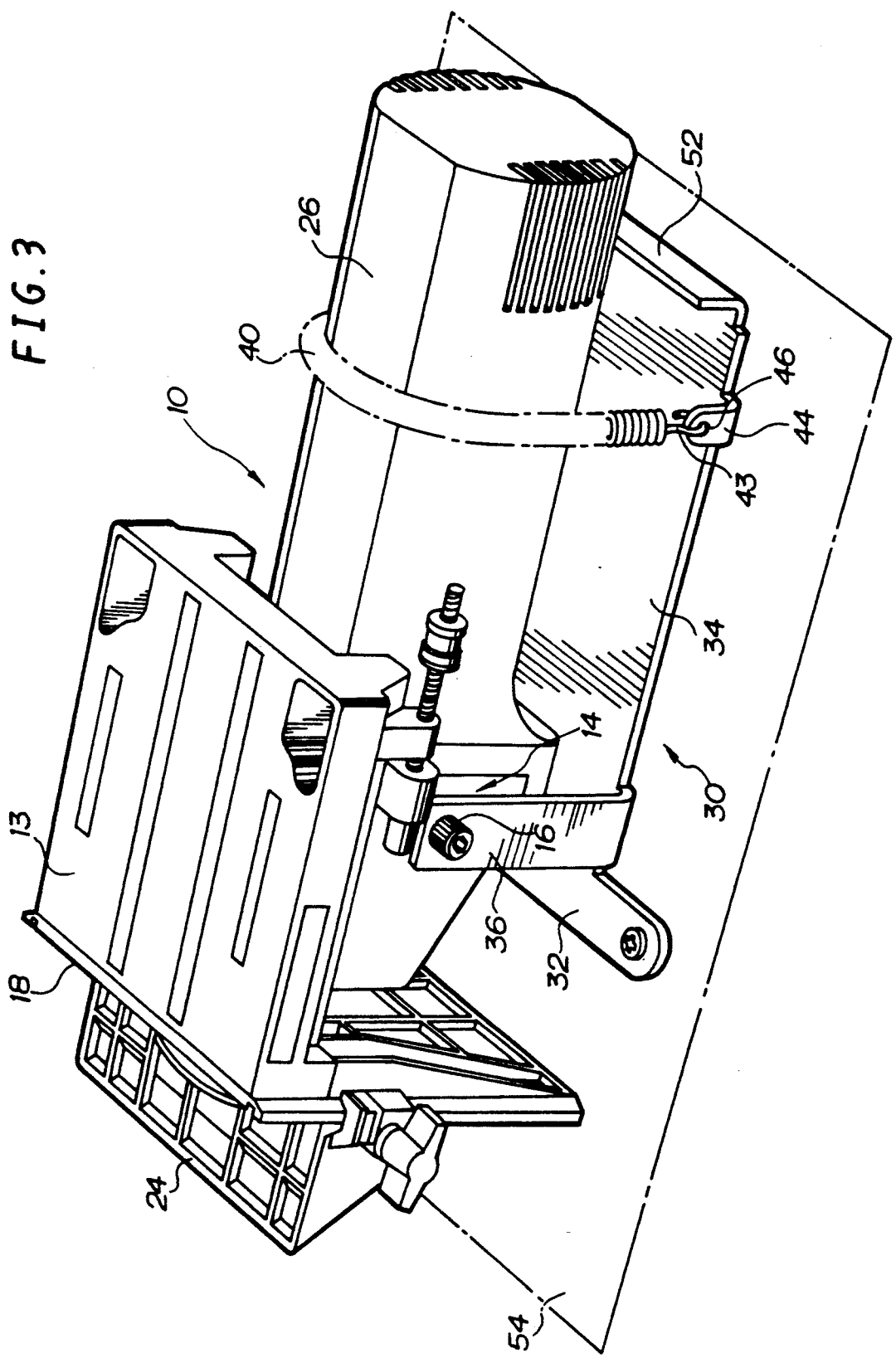
FIG. 3 is a perspective view of the mounting assembly fastened to the conventional hand-held joiner and a bench FIG. 4 cross-sectional view of the mounting assembly components for adapting the mounting assembly for use with a conventional hand-held joiner of dimension.

FIG. 3 illustrates the mounting assembly 30 in a bench-mounted position whereby a conventional plate joiner 10 is securely mounted to a bench or work station surface 54. In preparation for mounting the tool 10 to the surface 54 by, the handle 12 of the tool 10 is removed by unscrewing the bolts 16 (FIG. 1) to expose the mounting points 14, and the tool 10 is inverted so that the base 13 faces away from the bench surface 54. The mounting plate 32 is placed between the tool 10 and the surface 54 with the flat portion 34 of the plate 32 lying flush against the surface 54 and the mounting arms 36 extending away from the surface 54.

The tool 10 is positioned between the mounting arms 36 so that the holes 37 of the arms 36 are aligned with the exposed mounting points 14 of the tool 10. Preferably, the distance between the mounting arms 36 is such that the tool 10 will snugly fit therebetween. Fasteners or bolts 38 are passed through the holes 37 of the mounting arms 36 and the bores of the mounting points 14 in order to firmly secure the mounting arms 36, and, therefore, the mounting plate 32, to the tool 10. The original handle bolts 16 may alternatively be used to fasten the mounting arms 36 to the power tool 10. To prevent rotation of the tool 10 relative to the mounting plate 32 during operation of the tool, the elongated spring 40 is tightly wrapped around the housing 26 of the tool 10 with the end hooks 43 attached to the coupling projections 44 of the mounting plate 32. The lip 52 of the mounting plate 32 helps to hold the tool properly oriented so that the surfaces of the fences 18 and 24 may be generally aligned perpendicular and parallel, respectively, to the bench surface 54 when mounted thereto, thus allowing the surface 54 to aid in the alignment of a workpiece.

The mounting plate 32 may be secured to the bench surface 54 by screwing mounting screws 50 through the holes 48 provided in the mounting plate 32 and into the surface 54. Alternatively, the mounting plate 32 may be clamped to the bench surface using conventional clamping fixtures or may be secured to the mounting surface 54 by other suitable, conventional fastening devices. The particular order in which the various components of the mounting assembly 30 are placed in mounted position is not critical. Accordingly, the mounting plate 32 may initially be secured to the tool 10 and subsequently to the bench surface 54 or vice-versa.

With the tool 10 and mounting assembly 30 in a bench-mounted position, the tool 10 is held fixed and in an inverted position so that the cutting blade of the tool 10 is made easily accessible. To operate the tool, a user positions a workpiece to be cut against the integral fence 18 of the joiner 10 using the adjustable fence 24 as a by guide. The alignment and indexing of the workpiece with respect to the tool 10 in preparation for cutting a joint is the same as for conventional hand-held use of the tool 10. To make a cut, the workpiece is pressed against the integral fence 20 with enough force to overcome the spring bias holding the integral fence 18 in its forward position (with the cutting blade retracted). As the workpiece is pressed against the integral fence 18, the cutting blade is forced out of the recess 20 to cut the workpiece. Once the cut is made, the workpiece may be withdrawn from engagement with the tool 10, allowing the integral fence 18 to move forward again under the spring bias so that the blade is returned to a retracted position.

By employing the mounting assembly 30 to securely mount the hand-held power tool 10 to a bench surface, the amount of time required for cutting joints in a workpiece, as compared to cutting joints without the use of the mounting assembly 30, is substantially reduced. For example, a typical work cycle involving the use of the hand-held power tool 10 without the assistance of the mounting assembly 30 would consist of the following steps:

1. Select and grasp a previously dimensioned workpiece.
2. Move the workpiece to a suitable work surface and secure the workpiece to the work surface with the area to receive the joint made accessible to the hand-held joiner.
3. Grasp and move the hand-held joiner to the workpiece and position in preparation for making a cut.
4. Plunge the joiner against the workpiece thereby cutting a joint.
5. Remove the joiner to a suitable safe location.
6. Re-position the workpiece for additional joint cutting if necessary. workpieces.

The work cycle, however, for cutting a joint in a workpiece with the tool 10 fixedly mounted using the mounting assembly 30 to a bench surface would consist of the following steps:
1. Select and grasp a previously dimensioned workpiece.
2. Move the workpiece to the joiner and position in preparation for making a cut.
3. Press the workpiece against the joiner thereby cutting a joint.
4. Rotate the workpiece and repeat step 3 for any additional joints if necessary.
5. Repeat the process for additional workpieces.

The number of steps required to make a cut is less when the mounting assembly 30 is employed. In a stopwatch time study, wherein the cutting of 25 separate, single joints made in the edges of dimensioned 1×4×6 inch workpieces was observed, it required, on the average, approximately 12 seconds to make a single cut using the mounting assembly 30 in conjunction with the tool 10. The error was approximately 5% and the accuracy approximately 90%. With the same error and accuracy percentages and without the assistance of the mounting assembly 30, it required on the average approximately 30 seconds for a single joint cut to be made.

The mounting assembly 30 of the present invention may be adapted to mount to different types of power tools having various distances between the mounting points 16 of their handle. Rather than requiring that the mounting plate 32 be specifically dimensioned to fit a particular power tool, the mounting assembly 30 may be provided with accessories that compensate for different sized hand-held tools.

Figure 4:
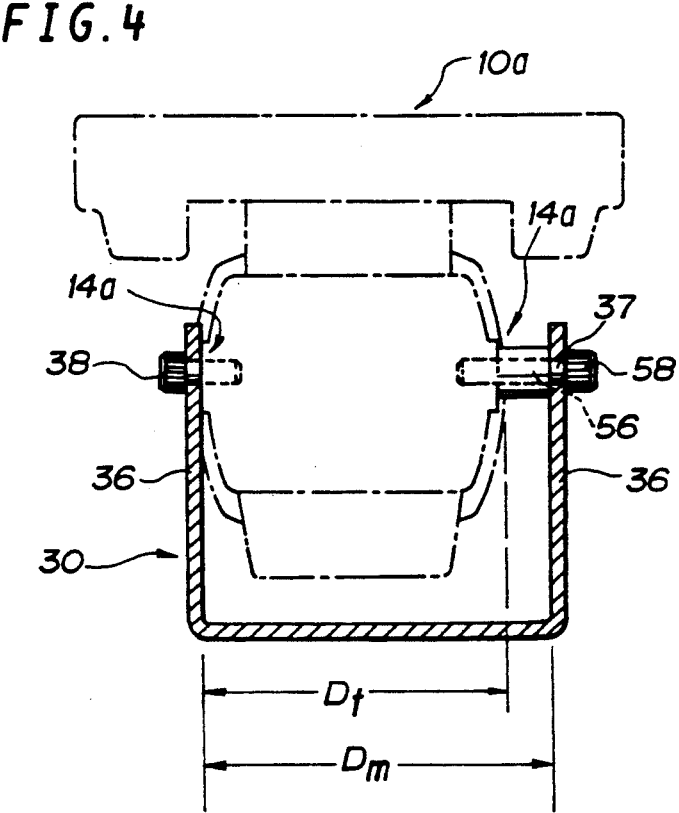

Referring to FIG. 4 by, a hand-held tool 10a having a distance $D_t$ between its mounting points 14a is shown. This distance $D_t$, however, is shorter than a preset distance $D_m$ between the mounting arms 36 of the mounting plate 32. In order to compensate for this discrepancy between the two distances, a spacer 56 may be inserted between one of the mounting arms 36 and the tool 10a. A bolt 58 that is sufficiently long enough to extend through the hole 37 of the mounting arm and the spacer 56 and into the mounting point bore 14a is provided. The spacer 56 may be a simple tube that is dimensioned to fit between one of the mounting arms 36 and the tool 10a when the mounting assembly 30 is in use so that the mounting arms 36 may effectively grip the tool 10a. The spacer 56 may be made of a hard plastic, aluminum, steel or other suitable material. Preferably, the mounting plate 32 is dimensioned so that the distance $D_m$ between the mounting arms 36 is sufficiently long so that the mounting plate 32 will fit the widest hand-held tool for which the assembly 30 is likely to be used. Different size spacers 56 may then be used to compensate for tools that have smaller widths.

Figure 5:
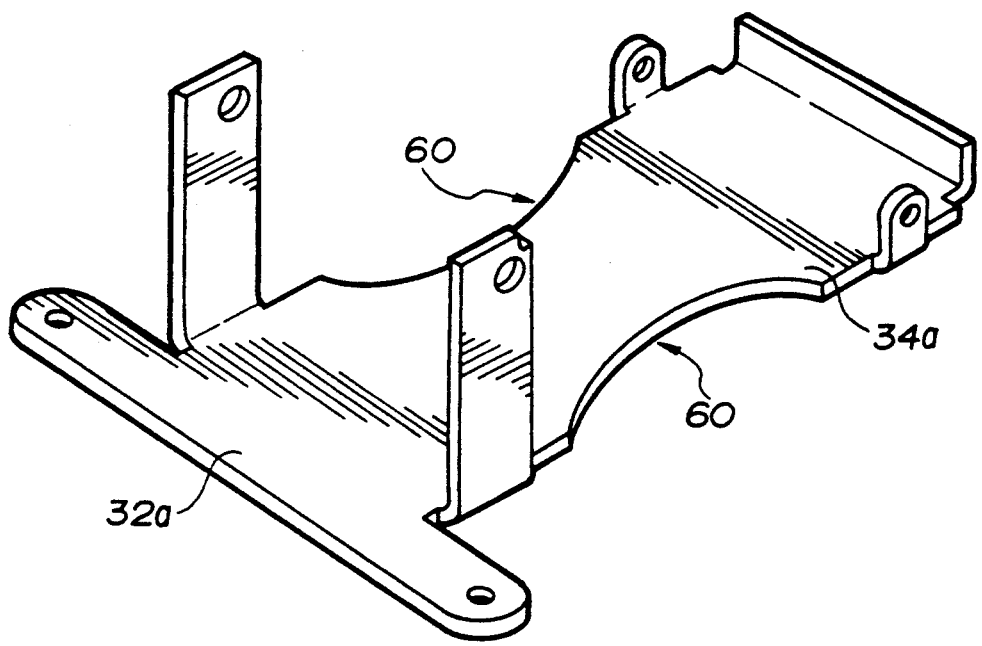
FIG. 5 is a perspective view of an alternate embodiment of the mounting plate of the present invention.

Referring to FIG. 5, a second embodiment of the mounting plate is illustrated. As shown, the flat portion 34a of the mounting plate 32a is made narrower at portions 60 located on opposite sides of the plate 32a. The narrowed portions 60 of the mounting plate 32a act as a grip so that the tool may be used in a conventional manner while the mounting assembly 30 is attached thereto. By adapting the plate 32a to be easily gripped about the portions 60 by an operator, the entire mounting assembly need not be removed from the tool 10 when temporarily transferring from bench use to handheld use.

With the present invention, a hand-held tool, such as a hand-held joiner or grinder, may be readily and economically adapted for bench use by attaching the relatively few and simple parts of the mounting assembly 30, which parts may also be quickly removed when it is desired to use the tool in a conventional manner. The mounting assembly 30 improves the versatility of the hand-held tool by allowing the tool to interchange easily between hand-held and stationary bench use.

While the invention has been described with specific embodiments thereof, it will be understood that the invention is capable of further modifications. The appended claims are intended to cover any variations, uses or adaptations of the invention following, in general, the principles of the invention, and including such departures from the present disclosure as fall within known and customary practice within the art to which the invention pertains.

What is claimed is:

1. A mounting assembly for mounting onto a mounting surface a hand-held tool having a handle that is removably attached to said tool at at least one mounting point, comprising:
   a mounting plate comprising a substantially flat portion and at least one mounting arm extending from said flat portion, said at least one mounting arm having a hole for receiving a fastener; and
   means for securing said mounting plate to said mounting surface;
   wherein said mounting assembly is adapted to removably engage said tool and said mounting surface in order to mount said tool to said mounting surface with the handle of said tool removed, the flat portion of said mounting plate lying flush against said mounting surface and secured thereto by said securing means, and said mounting arm being attached to said tool at said at least one mounting point by said fastener; p1 and further wherein:
   said mounting plate comprises a pair of coupling fixtures;
   said assembly further comprises an elongated spring having two opposite ends, each of said ends further having means for engaging a respective one of said fixtures of said mounting plate; and
   when said mounting assembly engages said tool, said elongated spring extends around a portion of said tool with said engaging means engaging the respective coupling fixtures of said mounting plate.

2. A mounting assembly for mounting onto a mounting surface a hand-held tool having a handle that is removably attached to said tool at at least one mounting point, comprising: a mounting plate comprising a substantially flat portion and at least one mounting arm extending from said flat portion, said at least one mounting arm having a hole for receiving a fastener; and
   means for securing said mounting plate to said mounting surface;
   wherein said mounting assembly is adapted to removably engage said tool and said mounting surface in order to mount said tool to said mounting surface with the handle of said tool removed, the flat portion of said mounting plate lying flush against said mounting surface and secured thereto by said securing means, an said mounting arm being attached to said tool at said at least one mounting point by said fastener;
   said further wherein said mounting plate is provided with a lip for properly orienting the tool when the mounting assembly engages the tool.

3. A mounting assembly for mounting onto a mounting surface a hand-held tool having a handle that is removably attached to said tool at two mounting points positioned substantially on opposite sides of said tool, comprising:
- a mounting plate comprising a substantially flat portion and a pair of mounting arms extending from said flat portion at an angle, said mounting arms each having a hole for receiving a fastener; and
- means for securing said mounting plate to said mounting surface;
- wherein said mounting assembly is adapted to removably engage said tool and said mounting surface in order to mount said tool to said mounting surface with the handle of said tool removed, the flat portion of said mounting plate lying flush against said mounting surface and secured thereto by said securing means, and said mounting arms each being attached to respective said mounting points of said mounting tool by said fasteners;
- and further wherein:
- said mounting plate has a pair of coupling fixtures;
- said assembly further comprises an elongated spring having two opposite ends, each of said ends further having means for engaging a respective one of said coupling fixtures of said mounting plate;
- wherein when said mounting assembly engages said tool, said elongated spring extends around a portion of said tool with said engaging means engaging the respective coupling fixtures of said mounting plate.

4. A mounting assembly for mounting onto a mounting surface a hand-held tool having a handle that is removably attached to said tool at two mounting points positioned substantially on opposite sides of said tool, comprising:
- a mounting plate comprising a substantially flat portion and a pair of mounting arms extending from said flat portion at an angle, said mounting arms each having a hole for receiving a fastener; and
- means for securing said mounting plate to said mounting surface;
- wherein said mounting assembly is adapted to removably engage said tool and said mounting surface in order to mount said tool to said mounting surface with the handle of said tool removed, the flat portion of said mounting plate lying flush against said mounting surface and secured thereto by said securing means, and said mounting arms each being attached to respective said mounting points of said mounting tool by said fasteners; and
- further comprising a spacer having a hole, said spacer adapted to be positioned between one of said mounting arms and a respective one of said mounting points of said tool when the mounting arm is attached to said tool.

5. A mounting assembly for mounting onto a mounting surface a hand-held tool having a handle that is removably attached to said tool at two mounting points positioned substantially on opposite sides of said tool, comprising:
- a mounting plate comprising a substantially flat portion and a pair of mounting arms extending from said flat portion at an angle, said mounting arms each having a hole for receiving a fastener; and
- means for securing said mounting plate to said mounting surface;
- wherein said mounting assembly is adapted to removably engage said tool and said mounting surface in order to mount said tool to said mounting surface with the handle of said tool removed, the flat portion of said mounting plate lying flush against said mounting surface and secured thereto by said securing means, and said amounting arms each being attached to respective said mounting points of said mounting tool by said fasteners; and
- wherein said mounting plate is provided with a lip for properly orienting the tool when the mounting assembly engages the tool.

6. A mounting assembly for mounting onto a mounting surface a hand-held joiner power tool having a blade and fence assembly at one end of said tool, a housing that extends away from said blade and fence assembly, and a handle that extends outwardly from said power tool and that is removably attached to said power tool at two mounting points, comprising:
- a mounting plate comprising a substantially flat portion, a pair of mounting arms extending outwardly from said flat portion at an angle, and a pair of coupling fixtures, said mounting arms each having an engagement hole for receiving a fastener;
- an elongated spring having two opposite ends, each end further having means for engaging a respective one of said coupling fixtures of said mounting plate; and
- means for securing said mounting plate to said mounting surface;
- wherein said mounting assembly is adapted to removably engage said power tool and said mounting surface in order to mount said tool to said mounting surface with said handle of said power tool removed, said mounting arms coupled to respective said mounting points by said fasteners, said flat portion of said mounting plate lying flush against said mounting surface and secured thereto by said securing means, and said elongated spring wrapped around said housing of said power tool with the engaging the means engaging respective said coupling fixtures of said mounting plate.

7. The mounting assembly of claim 6, wherein said mounting points are located on substantially opposite sides of said power tool and said mounting arms extend along said opposite sides when said mounting plate is secured to said power tool.

8. The mounting assembly of claim 6, wherein said mounting plate is adapted to be attached to said tool such that said mounting plate is positioned on the side of the tool from which said handle extends when attached to said tool.

9. The mounting assembly of claim 6, wherein said flat portion of said mounting plate is provided with indentations that assist in gripping of the plate.

* * * * *